United States Patent
Jurzak

(10) Patent No.: US 9,313,771 B2
(45) Date of Patent: Apr. 12, 2016

(54) METHOD AND DEVICE FOR ALLOCATING A CHANNEL IN A DECENTRALIZED TRUNKED RADIO COMMUNICATION SYSTEM

(75) Inventor: Pawel Jurzak, Cracow (PL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 456 days.

(21) Appl. No.: 13/879,980

(22) PCT Filed: Oct. 20, 2010

(86) PCT No.: PCT/PL2010/000104
§ 371 (c)(1),
(2), (4) Date: May 10, 2013

(87) PCT Pub. No.: WO2012/053916
PCT Pub. Date: Apr. 26, 2012

(65) Prior Publication Data
US 2013/0250936 A1    Sep. 26, 2013

(51) Int. Cl.
| | | |
|---|---|---|
| *H04W 4/00* | (2009.01) | |
| *H04W 72/02* | (2009.01) | |
| *H04W 4/08* | (2009.01) | |
| *H04W 8/18* | (2009.01) | |
| *H04W 84/08* | (2009.01) | |
| *H04W 24/00* | (2009.01) | |
| *H04W 48/16* | (2009.01) | |
| *H04W 72/04* | (2009.01) | |
| *H04W 84/12* | (2009.01) | |

(52) U.S. Cl.
CPC .............. *H04W 72/02* (2013.01); *H04W 4/08* (2013.01); *H04W 8/186* (2013.01); *H04W 84/08* (2013.01); *H04W 24/00* (2013.01); *H04W 48/16* (2013.01); *H04W 72/04* (2013.01); *H04W 84/12* (2013.01)

(58) Field of Classification Search
CPC ........ H04W 84/08; H04W 72/02; H04W 4/08
See application file for complete search history.

(56) References Cited

U.S. PATENT DOCUMENTS

| | | | |
|---|---|---|---|
| 5,239,678 A | 8/1993 | Grube et al. | |
| 6,882,663 B2 * | 4/2005 | Biggs | H04J 3/0652 370/436 |
| 2002/0173311 A1 * | 11/2002 | Biggs | H04W 74/0866 455/450 |
| 2003/0153319 A1 | 8/2003 | Wieczorek et al. | |

(Continued)

FOREIGN PATENT DOCUMENTS

JP    WO 2010050529 A1 *    5/2010    ............ H04W 48/20

OTHER PUBLICATIONS

International Search Report and Written Opinion for counterpart International Patent Application No. PCT/PL2010/000104 mailed Apr. 13, 2011.

*Primary Examiner* — Derrick Ferris
*Assistant Examiner* — Farhad Ali

(57) ABSTRACT

A method and device for allocating a channel in a decentralized trunked radio communication system enables efficient channel utilization. The method includes scanning at a first subscriber unit a plurality of channels to determine whether a call of interest to a first subscriber unit is active in the system (step 410). The plurality of channels is then scanned at the first subscriber unit to identify a first channel that is clear in the plurality of channels after determining that there is no call of interest to the first subscriber unit active in the system (step 415). The first subscriber unit is then tuned to the first channel that is clear (step 420).

12 Claims, 5 Drawing Sheets

(56) References Cited

U.S. PATENT DOCUMENTS

| | | | | |
|---|---|---|---|---|
| 2004/0190487 A1* | 9/2004 | Biggs | ............... | H04J 3/0652 370/350 |
| 2005/0174963 A1* | 8/2005 | Hsu | ............... | H04W 24/00 370/329 |
| 2005/0198337 A1* | 9/2005 | Sun | ............... | H04W 36/0016 709/230 |
| 2007/0129079 A1* | 6/2007 | Schwarz | ............... | H04W 72/10 455/450 |
| 2009/0016283 A1* | 1/2009 | Zhang | ............... | H04W 74/006 370/329 |
| 2010/0085953 A1 | 4/2010 | Patel et al. | | |
| 2010/0087142 A1 | 4/2010 | Panpaliya et al. | | |
| 2010/0087199 A1 | 4/2010 | Chowdhary et al. | | |
| 2011/0199959 A1* | 8/2011 | Fukuzawa | ............... | H04W 48/20 370/315 |

* cited by examiner

METHOD AND DEVICE FOR ALLOCATING A CHANNEL IN A DECENTRALIZED TRUNKED RADIO COMMUNICATION SYSTEM

This application claims priority to PCT Application Ser. No. PCN/PL2010/000104 filed Oct. 20, 2010 entitled "Method And Device For Allocating A Channel In A Decentralized Trunked Radio Communication System," the contents of which are expressly incorporated herein by reference in their entirety.

FIELD OF THE DISCLOSURE

The present disclosure relates generally to two-way wireless trunked communication systems.

BACKGROUND

Many varieties of two-way radio communication systems are known in the art. FIG. 1 is a block diagram illustrating both a typical conventional radio communication system 101 and a trunked radio communication system 103. In the conventional radio system 101, a plurality of subscriber units (SUs) are formed into talk groups. Each talk group uses separate channels for communication. Thus, each talk group is served by one channel. In contrast, the trunked radio system 103 and its subscriber units use a pool of channels for virtually an unlimited number of talk groups. Thus, all talk groups are served by all channels. The trunked radio system 103 works to take advantage of the probability that not all talk groups need a channel for communication at the same time. Estimates are made about how much load a typical user presents to the system in terms of calls per hour and duration of each call. For a traffic load, fewer channels are required since all talk groups are served by all channels. Combining this with the number of users on the system, and the acceptable quality of service (QoS), determines how many trunked channels are required to satisfactorily serve the number of users. With a given number of channels, a much greater number of talk groups can be accommodated as compared with conventional radio systems. Hence, a primary purpose of a trunked radio system is the efficient utilization of channels allowing for more users to carry many conversations over a fewer number of distinct channels.

As seen in FIG. 2, a trunked radio communication system can be either a centralized trunked radio system 201 or a decentralized trunked radio system 203. A centralized trunked radio system 201 uses a dedicated or exclusive channel, which is often referred to as a control channel, for communication between subscriber units and a central controller 205. Other terms that sometimes refer to the central controller 205 include trunking controller, site controller, resource allocator, channel allocator, controller, and other like terms. The subscriber units constantly monitor the control channel for channel assignment instructions. In order to start a group call (i.e., a one-to-many call), a subscriber unit requests that a channel is allocated for its use, and the central controller 205 transmits instructions telling the subscriber units in the talk group to switch to a traffic channel assigned for that call. A similar process is followed when a subscriber unit starts an individual call (i.e., a one-to-one call).

A decentralized trunked radio system 203, however, does not require the use of an exclusive channel. The intelligence or control function for assignment of a channel to a call remains in the subscriber units. Thus, the decentralized trunked radio system 203 can co-exist with conventional users on the same channels without the use of the control channel. When a call is initiated by a subscriber unit, the channel assignment is determined by the logic in subscriber units or base stations, not by a controller. In operation, a subscriber unit generally scans the channels, finds an idle channel and starts a call on the idle channel.

However, a disadvantage of the decentralized trunked radio system 203 is that the scan to find an idle channel significantly increases the access time, which often provides for unacceptably high latency delays during call set up. There is therefore a need for an improved method and device for allocating a channel in a decentralized trunked radio communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
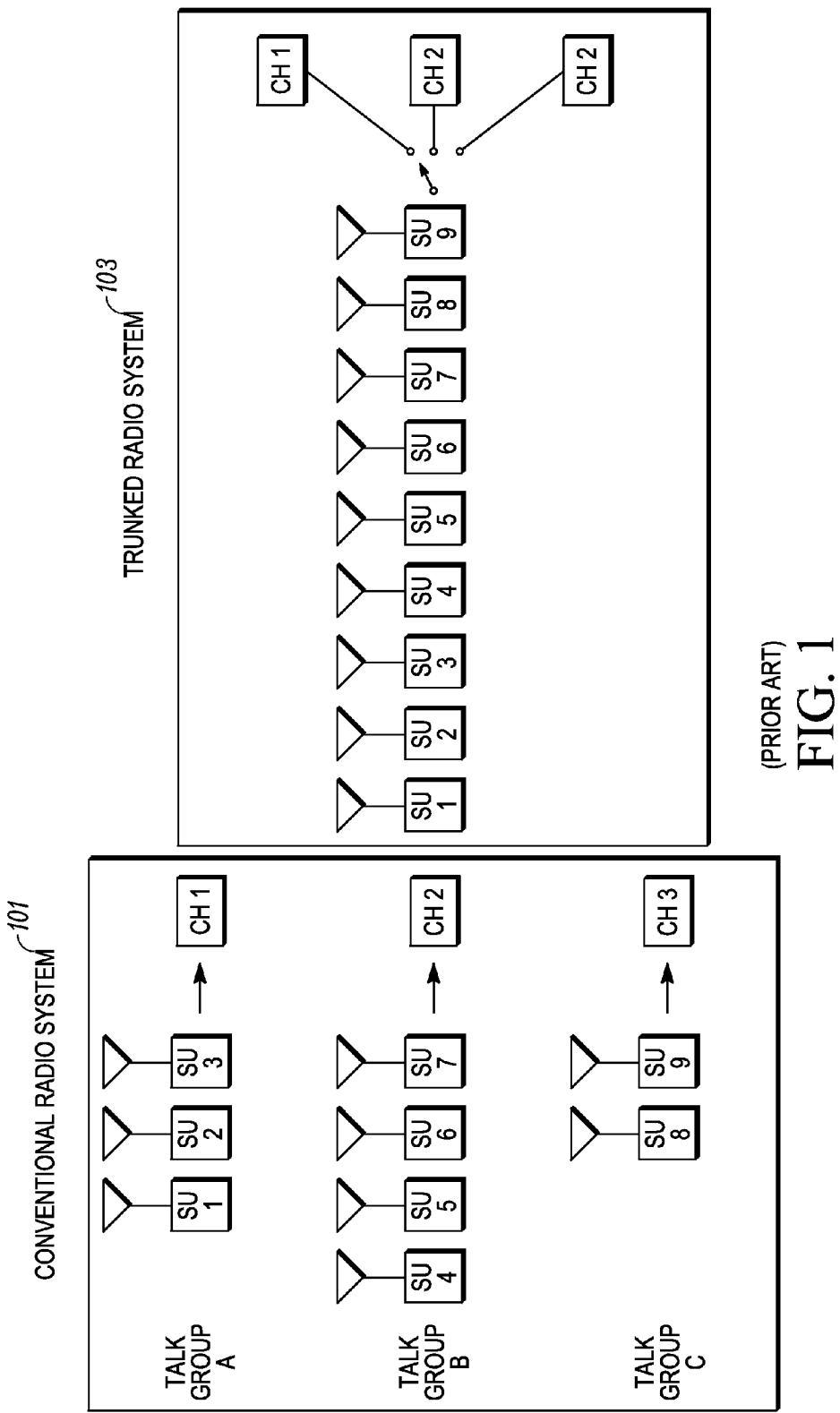
FIG. 1 is a diagram illustrating both a typical conventional radio communication system and a trunked radio communication system, according to the prior art.
Figure 2:
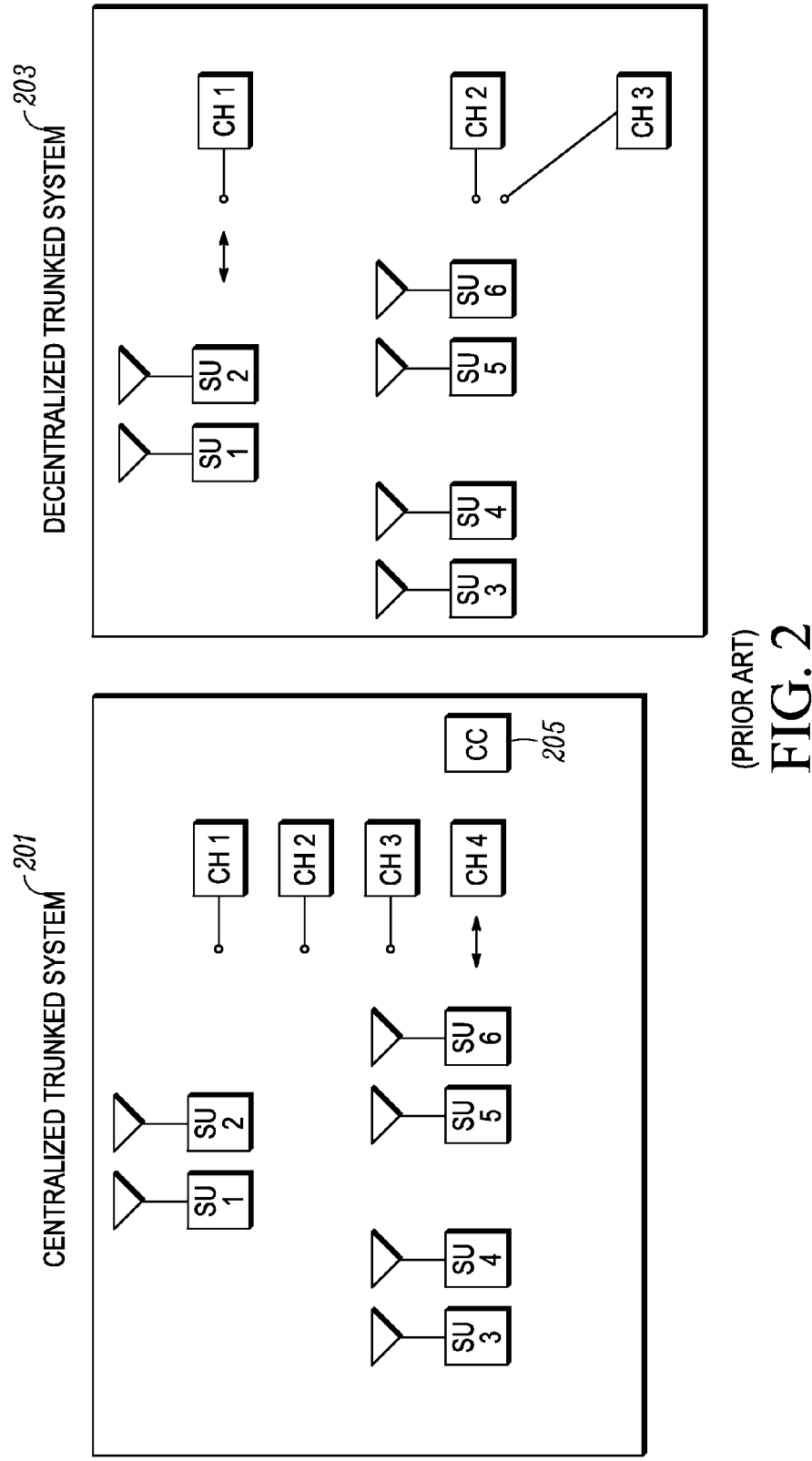
FIG. 2 is a diagram illustrating both a centralized trunked radio communication system and a decentralized trunked radio communication system, according to the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

According to one embodiment, a method enables efficient allocation of a channel in a decentralized trunked radio communication system. The method includes a first subscriber unit scanning a plurality of channels to determine whether a call of interest to the first subscriber unit is active in the system. After determining that there is no call of interest to the first subscriber unit active in the system, the plurality of channels is scanned to identify a first channel that is clear in the plurality of channels. The first subscriber unit is then tuned to the first channel that is clear.

Embodiments as described herein thus enable improved system availability and efficient channel utilization, as no control channel or rest channel is required, and subscriber units do not need to continuously scan for calls of interest.

The method can be performed when a subscriber unit is first activated. When the first subscriber unit scans the plurality of channels to determine whether a call of interest is present, if a call of interest is present then the first subscriber unit can simply tune to the relevant channel and participate in the call. If there is no call of interest present, the first subscriber unit searches for the first clear channel and tunes to it. If all channels are busy the first subscriber unit continues searching until there is a call of interest present or a clear channel available.

When a new call is initiated, base stations in the communication system can communicate with each other over a communication link such as an internet protocol (IP) link, and inform other subscriber units about the new call. Further, only idle base stations need to transmit a channel change signal when the new call is initiated.

Subscriber unit is a term well known in the art and refers, for example, to mobile radios, mobile stations, mobile equipment, handsets, mobile subscribers, or an equivalent.

Figure 3:
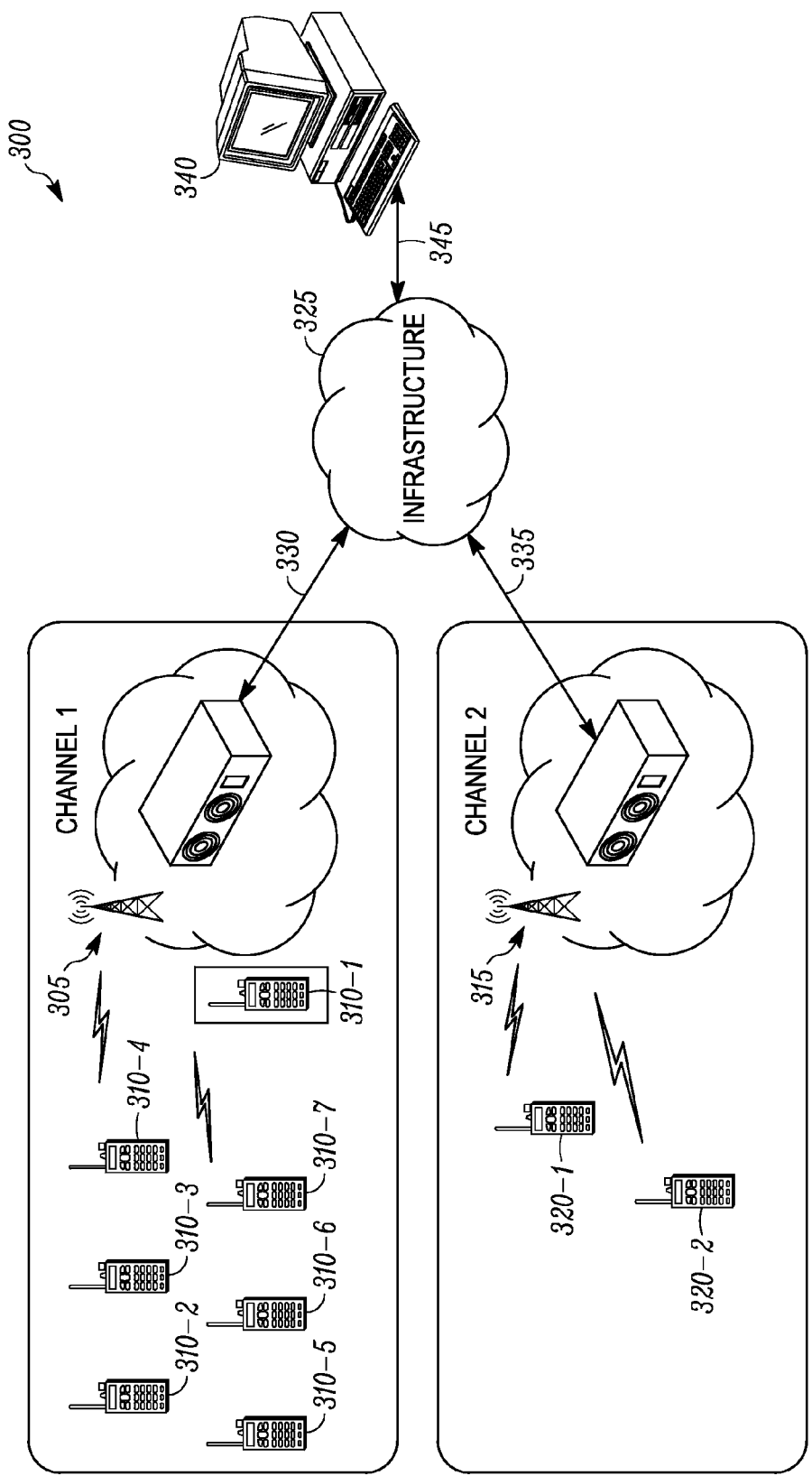
FIG. 3 is a diagram illustrating a decentralized trunked radio communication system, in accordance with some embodiments.

Referring to FIG. 3, a diagram illustrates a decentralized trunked radio communication system 300, according to one embodiment. A first base station 305 functioning as a base transceiver station (BTS) using a channel 1 is in wireless communication with a plurality of subscriber units 310-n (i.e., subscriber units 310-1 to 310-7). A second base station 315 functioning as a BTS using a channel 2 is in wireless communication with a plurality of subscriber units 320-n (i.e., subscriber units 320-1 and 320-2). The first base station 305 and the second base station 315 can communicate with each other through a communication link using an infrastructure 325. A two way communication link 330 using, for example, an internet protocol (IP) is thus provided between the first base station 305 and the infrastructure 325; and similarly a two way communication link 335 using, for example, an internet protocol (IP) is provided between the second base station 305 and the infrastructure 325. As will be understood by those having ordinary skill in the art, the infrastructure 325 can include various hardware such as Internet servers and routers and their associated wired and wireless communication equipment, such as Ethernet, cable and transceiver equipment. Other communication nodes, such as a computer console 340, also can be connected to the infrastructure links 345. The base stations 305, 315 also may be directly interconnected.

When the subscriber unit 310-1 is switched on, it scans through all available channels to determine whether there is an active call of interest, such as a group call of a talk group in which the subscriber unit 310-1 is a member. For example, a first talk group may include the subscriber units 310-1, 320-1 and 320-2. If there is a call of interest in progress, such as a group call involving the first talk group, then the subscriber unit 310-1 tunes to the channel, such as channel 2, designated for the group call and participates in the call.

However, if there is no active call of interest when the subscriber unit 310-1 scans through all available channels, then the subscriber unit 310-1 begins scanning through all available channels to identify a first clear channel. When a first clear channel, such as channel 1, is identified then the subscriber unit 310-1 tunes to the clear channel and remains on that channel. No dedicated rest channel is required, thus the various subscriber units 310-n and 320-n do not need to be updated concerning the identity of such a rest channel.

If the subscriber unit 310-1 scans through all available channels but is unable to identify a first clear channel, then the subscriber unit 310-1 continues scanning until either a call of interest is activated or a clear channel is identified. As described above, the subscriber unit 310-1 will then tune either to the call of interest or to the clear channel, respectively. Also, the subscriber unit 310-1 may scan only particularly configured channels rather than all available channels while searching for a clear channel or call of interest.

After tuning to a clear channel the subscriber unit 310-1 may send a message to the base station 305 periodically, such as every few seconds, to ensure proper operation of the base station 305. Further, the base station 305 may inform the subscriber unit 310-1 that a particular channel is out of service. That enables the subscriber unit 310-1 to skip that channel during searching and effectively speed the channel search process. Still another option is for the base station 305 to transmit a message at predetermined intervals to indicate that a particular clear channel is operational. If a subscriber unit 310-n does not receive such a message within a predetermined interval, the subscriber unit 310-n determines that the channel is out of service and moves to another clear channel.

When the subscriber unit 310-1 initiates a new call, such as a group call or a call to a particular second subscriber unit, the new call is activated on the channel to which the subscriber unit 310-1 is presently tuned. For example, if the subscriber unit 310-1 had identified channel 1 as the first clear channel when the subscriber unit 310-1 was activated, then the subscriber unit 310-1 will use channel 1 when the subscriber unit 310-1 initiates a call.

When a new call is a group call to a talk group on a first channel, a base station transmits a command, on a second channel, which commands other subscriber units in the first talk group to tune to the first channel. For example, if the subscriber unit 310-1 activates a group call to the first talk group including subscriber units 320-1 and 320-2, then the base station 305 will transmit a multicast IP message through the infrastructure 325 to the base station 315. The message identifies the first talk group and informs the base station 315 that the group call has been activated on channel 1. The base station 315 then transmits, using channel 2, a command to the subscriber units 320-1 and 320-2 that a new call for the first talk group is active on channel 1. To participate in the group call, the subscriber units 320-1 and 320-2 then will tune to channel 1. Further, non-participants in the group call, such as subscriber units 310-2, 310-3, 310-4, 310-5, 310-6 and 310-7 will move away from the call by tuning to a first clear channel other than channel 1.

Commands issued from the base stations 305, 315 can comprise various types of messages, including for example trunking signaling block (TSBK) or control signaling block (CSBK) messages, and can be unicast, multicast or broadcast. Further, a command issued from the base station 305 concerning a group call on channel 1 may be periodically retransmitted on a second channel, such as channel 2, to ensure full participation in the group call by all subscriber units 310-n, 320-n in the relevant talk group. Channel change commands also can be periodically repeated to ensure that any subscriber units 310-n, 320-n belonging to a relevant talk group, but which missed an initial channel change command, will move to the appropriate channel. Commands also can be issued or repeated from other nodes in the communication system 300 such as the computer console 340 or element of the infrastructure (325)

Further, when initiating a new group call to particular talk group, the subscriber unit 310-1 may wait for an allowance message from the base station 305 that a new group call can be initiated to that talk group. That enables the base station 305 to first conduct a scan to determine whether another group call concerning the same talk group is already active on another channel. If another group call concerning the same talk group is active on another channel then a denial message is sent from the base station 305 to the subscriber unit 310-1. Both an allowance message and a denial message can be, for example, a CSBK message.

Further, the base stations 305, 315 can communicate with each other during a group call initiation to ensure that only one group call at a given time per talk group is allowed by the system 300. Other means are also available for ensuring that multiple calls to a single talk group do not start simultaneously. For example, the computer console 340 or one of the base stations 305, 315 can store channel usage data, which data can be provided to a relevant base station 305, 315 during a call initiation process. Alternatively, token systems can be used to require base stations 305, 315 to transmit multicast messages to other base stations 305, 315 only during designated time slots.

According to some embodiments, there may be a need to avoid truncation of calls due to the amount of time required to move subscriber units 310-*n*, 320-*n* from an initial channel to another channel that is handling a group call of interest. That can be accomplished by delaying a first payload frame transmitted by a base station 305, 315 by several milliseconds (ms).

For example, a call initiation process may include the following time line:
0 ms: Subscriber unit 310-1 begins transmitting a first voice header (VHDR) frame 1 (duration of 45 ms) on channel 1.
1 ms: Base station 305 receives VHDR frame 1 and recognizes a talk group/network access code.
2 ms: Base station 305 transmits a multicast message to base station 315.
10 ms: Base station 315 (which is idle) receives the multicast message and transmits a TSBK message (duration of 37 ms) on channel 2 directing a channel change to channel 1.
47 ms: Subscriber units 320-1, 320-2 on clear channel 2 receive TSBK message.
60 ms: Subscriber units 320-1, 320-1 tune to channel 1.

Thus after 60 ms the subscriber units 320-1, 320-2 are ready to receive voice data for the new group call initiated on channel 1. However, the VHDR frame 1 would begin being transmitted from the base station 305 after 45 ms. Therefore, to be timely received by the subscriber units 320-1, 320-2, the VHDR frame 1 needs to be delayed by 15 ms (i.e., 60 ms-45 ms). That can be accomplished by having the base station 305 transmit a short terminator frame (SHT) having a duration of 15 ms at the beginning of the call. Also, "jitter buffers" that use SHTs can be enabled to delay, for example by 30 to 90 ms, the transmission of the VHDR frame 1.

Figure 4:
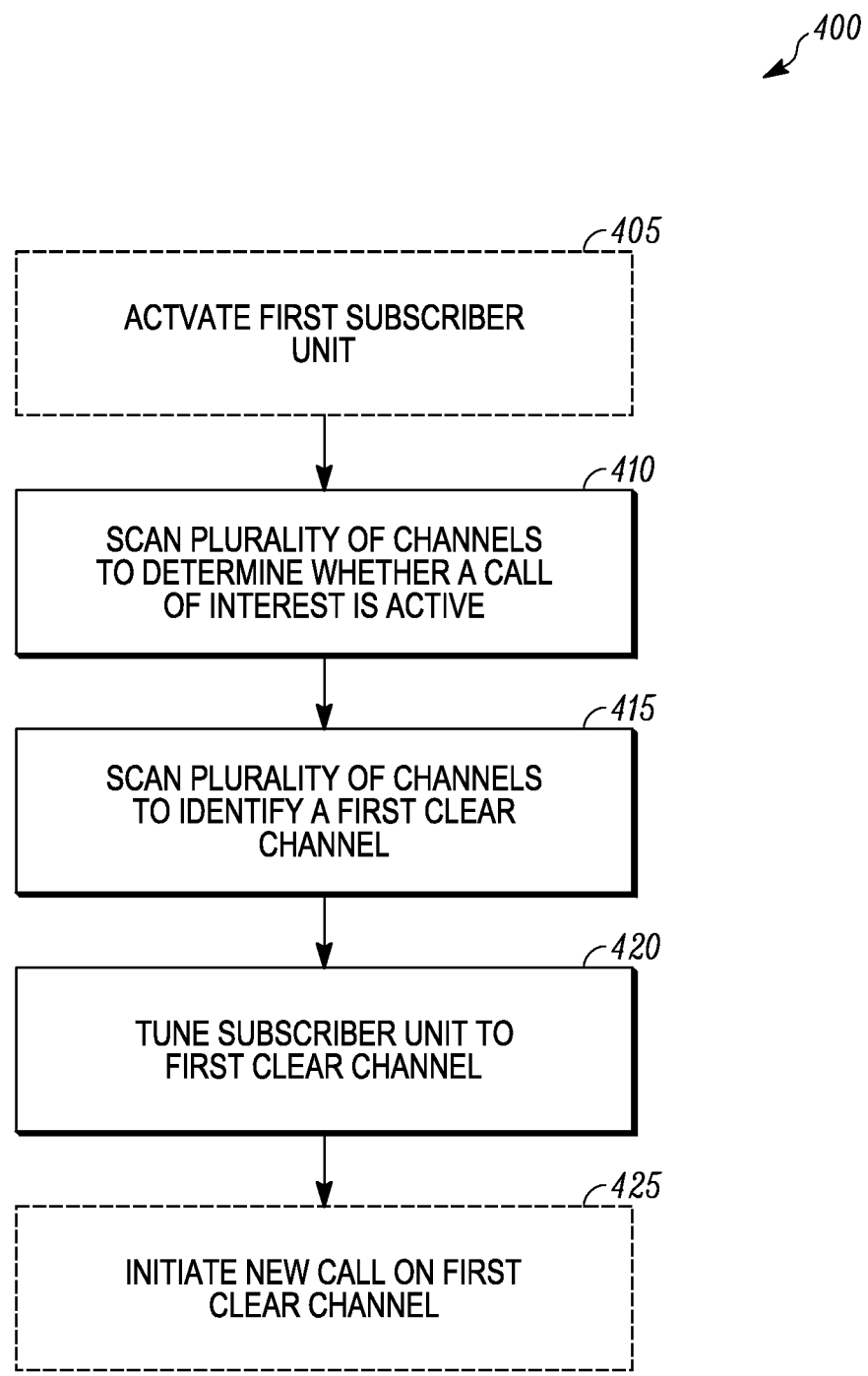
FIG. 4 is a flow diagram illustrating a method for allocating a channel in a decentralized trunked radio communication system, in accordance with some embodiments.

Referring to FIG. 4, a flow diagram illustrates a method 400 for allocating a channel in a decentralized trunked radio communication system, according to some embodiments. At step 405, a first subscriber unit is activated. For example, in the decentralized trunked radio communication system 300 the subscriber unit 310-1 is switched on.

At step 410, the subscriber unit scans a plurality of channels to determine whether a call of interest to a first subscriber unit is active in the system.

For example, the subscriber unit 310-1 scans all active channels in the decentralized trunked radio communication system 300 to determine whether a group call is in progress involving a talk group in which the subscriber unit 310-1 is a member.

At step 415, the subscriber unit scans the plurality of channels to identify a first channel that is clear in the plurality of channels after determining that there is no call of interest to the first subscriber unit active in the system. For example, the subscriber unit 310-1 may begin scanning channels in the communication system 300 and stop scanning when it determines that a particular channel, such as channel 1, is clear.

At step 420, the subscriber unit tunes to the first channel that is clear. For example, the subscriber unit 310-1 tunes to the first channel, such as channel 1, that is clear and then remains tuned to that channel.

At step 425, the first subscriber unit, after tuning to the first channel that is clear, initiates a new call on the first channel that is clear. For example, the subscriber unit 310-1 may initiate a new group call on channel 1 to a talk group that currently includes the subscriber units 320-1 and 320-2 that are currently tuned to channel 2.

Dashed lines are used in FIG. 4 to illustrate that steps 405 and 425 of the method 400 are optional. For example, some embodiments of the present disclosure may perform steps 410, 415, and 420 other than immediately after activating a subscriber unit. Further, following step 420, instead of initiating a new call a subscriber unit may participate in a call initiated by another subscriber unit.

The above examples thus describe a method for allocating a channel in a decentralized trunked radio communication system, which method enables more efficient channel utilization. For example, those skilled in the art will recognize that the methods of the present disclosure can be particularly efficient in decentralized trunked radio systems that use only a few conventional channels, such as two to four channels, where the costs of employing a centralized trunked radio system including site controllers and dedicated control channels are prohibitively high. Embodiments of the present disclosure may involve various types and combinations of wired and wireless networks, including for example wireless local area networks (WLANs), Worldwide Interoperability for Microwave Access (WiMax) networks, Ethernet communication networks, and Internet Protocol (IP) communication networks.

Figure 5:
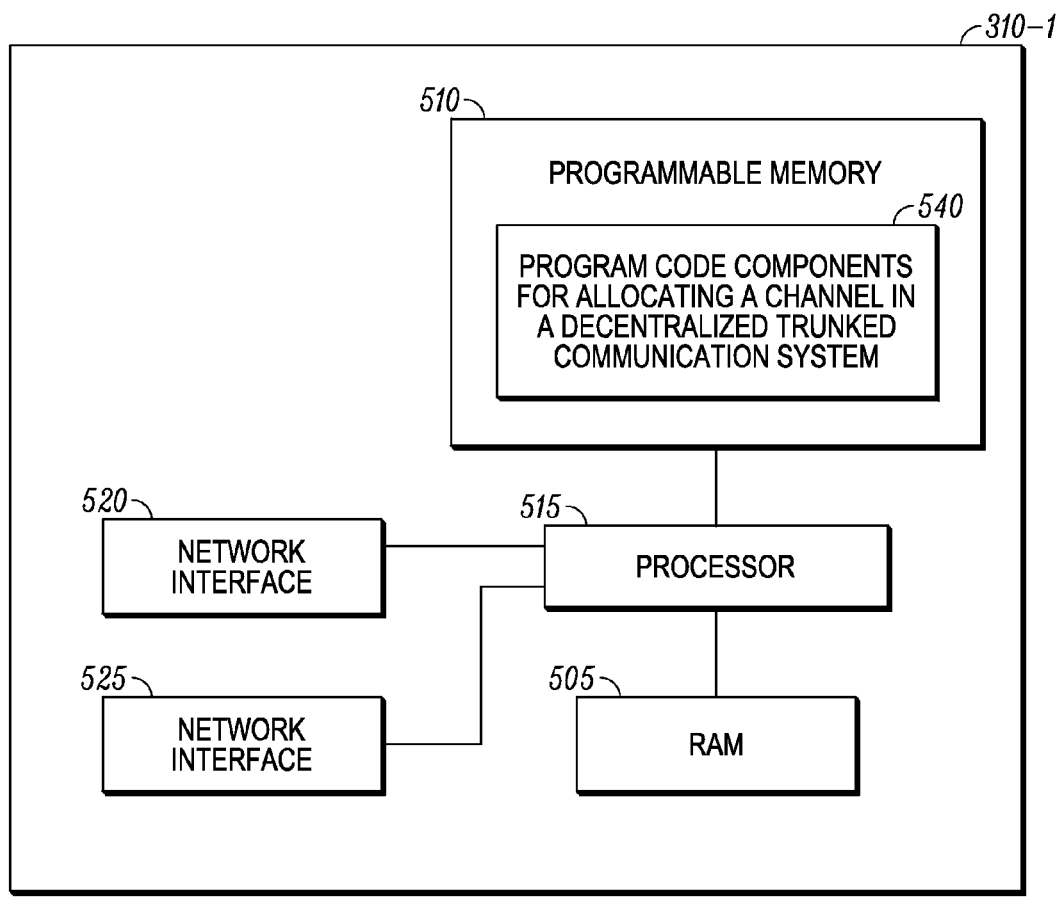
FIG. 5 is a block diagram illustrating components of a subscriber unit, in accordance with some embodiments.

Referring to FIG. 5, a block diagram illustrates components of a subscriber unit, such as the subscriber unit 310-1, according to an embodiment of the present disclosure. The subscriber unit 310-1, for example, can comprise an electronic communication device such as a computer or mobile telephone containing at least all the elements depicted in FIG. 5, as well as any other elements necessary for the subscriber unit 310-1 to perform its particular functions. Alternatively, the subscriber unit 310-1 can comprise a collection of appropriately interconnected units or devices, wherein such units or devices perform functions that are equivalent to the functions performed by the elements depicted in FIG. 5.

The subscriber unit 310-1 comprises a random access memory (RAM) 505 and a programmable memory 510 that are coupled to a processor 515. The processor 515 also has ports for coupling to network interfaces 520, 525. The network interfaces 520, 525 can be used to enable the subscriber unit 310-1 to communicate with other devices in various types of wired or wireless communication networks. For example the network interface 520 may enable the subscriber unit 310-1 to transmit messages, such as call initiation messages, to the base station 305 in the decentralized trunked radio communication system 300.

The programmable memory 510 can store operating code (OC) for the processor 515 and code for performing functions associated with a subscriber unit. For example, the programmable memory 510 can store computer readable program code components 540 configured to cause execution of a method, such as the method 400, for allocating a channel in a decentralized trunked radio communication system, as described herein.

Wireless portable electronic devices, such as a subscriber unit, that utilize and benefit from some embodiments can utilize various types of wireless network architectures including a mesh enabled architecture (MEA) network, or an Institute of Electrical and Electronics Engineers (IEEE) 802.11 network (e.g., 802.11a, 802.11b, 802.11g, 802.11n). It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access). Embodiments can then enable reliable wireless distribution of packets from a server to various base transceiver stations.

Advantages of some embodiments therefore include enabling improved system availability and efficient channel utilization, as no control channel or rest channel is required, and subscriber units do not need to continuously scan for calls of interest. Initial call connect time can be reduced, and there is a reduced risk that two subscriber units belonging to a same talk group will initiate a call at the same time on different channels. Further, no continuous scanning is required by individual subscriber units, and base stations do not need to maintain a status of other channels in a trunked radio system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for allocating a channel in a decentralized trunked radio communication system, the method comprising:

scanning at a first subscriber unit a plurality of channels to determine whether a call of interest to the first subscriber unit is active in the system;

scanning at a first subscriber unit the plurality of channels to identify a first channel that is clear in the plurality of channels after determining that there is no call of interest to the first subscriber unit active in the system; and tuning the first subscriber unit to the first channel that is clear;

determining whether a new call is of interest, and participating in the new call on the first channel if the new call is of interest;

determining whether the new call is of interest, and tuning to a clear channel if the new call is not of interest:

activating the first subscriber unit before scanning the plurality of channels; and initiating a new cell at a first subscriber unit on the first channel after tuning to the first channel that is clear, wherein the new call is a group call to a first talk group.

2. The method of claim 1, wherein the first subscriber unit continues to scan the plurality of channels after determining that there is no call of interest to the first subscriber unit active in the system and determining that all channels in the plurality of channels are busy.

3. The method of claim 1, wherein a first base station transmits in response to initiation of the new call, a command, on a second channel in the plurality of channels, which commands other subscriber units in the first talk group to tune to the first channel.

4. The method of claim 3, wherein the command transmitted from the first base station comprises a trunking signaling block (TSBK) or control signalling block (CSBK) message.

5. The method of claim 3, wherein the command transmitted from the first base station is periodically retransmitted on the second channel.

6. The method of claim 3, wherein the first base station transmits the command on the second channel only after receiving from a second base station a message that the first talk group is not active on a third channel in the plurality of channels.

7. The method of claim 1, wherein a first base station transmits, in response to initiation of the new call, a first message to a plurality of other base stations, and the first message identifies the first subscriber unit as belonging to the first talk group and identifies the new call as active on the first channel.

8. The method of claim 7, wherein the first message to the plurality of other base stations is a unicast, multicast or broadcast message.

9. An electronic communication device, comprising:

a processor; and a non-transitory memory operatively coupled to the processor, wherein the memory comprises:

computer readable program code components for scanning a plurality of channels to determine whether a call of interest to a device is active in the system;

computer readable program code components for scanning the plurality of channels to identify a first channel that is clear in the plurality of channels after determining that there is no call of interest to the device active in the system; and computer readable program code components for tuning the device to the first channel that is clear;

computer readable program code components for whether a new call is of interest, and participating in the new call on the first channel if the new call is of interest;

computer readable program code components for determining whether the new call is of interest, and tuning to a clear channel if the new call is not of interest wherein the memory further comprises computer readable program code components for activating the device before scanning the plurality of channels and computer readable program code components for initiating a new cell on the first channel after tuning to the first channel that is clear;

wherein the new cell is a group call to a first talk group.

10. The device of claim 9, wherein the device continues to scan the plurality of channels after determining that there is no call of interest to the device active in the system and determining that all channels in the plurality of channels are busy.

11. The device of claim 9, wherein a first base station transmits in response to initiation of the new call, a command, on a second channel in the plurality of channels, which commands other subscriber units in the first talk group to tune to the first channel.

12. The device of claim 9, wherein a first base station transmits, in response to initiation of the new call, a first message to a plurality of other base stations, and the first message identifies the device as belonging to the first talk group and identifies the new call as active on the first channel.

* * * * *